(12) United States Patent
Rawson, III

(10) Patent No.: US 7,318,164 B2
(45) Date of Patent: Jan. 8, 2008

(54) CONSERVING ENERGY IN A DATA PROCESSING SYSTEM BY SELECTIVELY POWERING DOWN PROCESSORS

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 10/015,225

(22) Filed: Dec. 13, 2001

(65) Prior Publication Data

US 2003/0115495 A1 Jun. 19, 2003

(51) Int. Cl.
*G06F 1/32* (2006.01)

(52) U.S. Cl. ..................................... 713/320
(58) Field of Classification Search .............. 713/300, 713/320
See application file for complete search history.

(56) References Cited

U.S. PATENT DOCUMENTS 6,711,691 B1 * 3/2004 Howard et al. ............. 713/300
6,901,522 B2 * 5/2005 Buch .......................... 713/320
7,032,119 B2 * 4/2006 Fung .......................... 713/320

* cited by examiner

*Primary Examiner*—James K. Trujillo
*Assistant Examiner*—Eric Chang
(74) *Attorney, Agent, or Firm*—Casimer K. Salys; Gregory Doudnikoff; Anthony V. S. England

(57) ABSTRACT

One or more processors are activated and deactivated responsive to processing activity in order to meet a performance or response requirement. Hardware facilities or software modules monitor workload. A policy manager receiving workload information determines processor number based on a predetermined performance criteria. A resource pool module selects which processors are activated and deactivated in response to changes in the determined processor number as determined by the policy manager. The resource pool module prepares a selected processor for deactivation by migrating any processes or thread running thereon to other processor(s) in the pool of available processors and by flushing the contents of the selected processor's cache memory. A CPU power control module transitions a processor selected for deactivation from a full power state to a low-power state.

21 Claims, 3 Drawing Sheets

CONSERVING ENERGY IN A DATA PROCESSING SYSTEM BY SELECTIVELY POWERING DOWN PROCESSORS

BACKGROUND

1. Field of the Present Invention

The present invention generally relates to the field of data processing systems and more particularly to a system and method for reducing energy consumption in a multi-processor system by selectively powering down one or more processors during periods of reduced activity.

2. History of Related Art

In the field of data processing systems, multi-processor systems are well known. For purpose of this disclosure, a multi-processor system refers generally to any system in which two or more microprocessors share access to common system memory typically comprised of dynamic random access memory (DRAM) or other suitable volatile memory element. Multi-processor systems offer the potential for improved performance by allowing more than one processor to execute portions of a data processing problem simultaneously. In one common example of a multi-processor system, a single system memory is shared by a set of processors connected to the memory via a common system bus. This embodiment is frequently referred to as a symmetric multiprocessor (SMP) system because each processor has substantially equivalent access to the system memory.

SMP systems and other multi-processor systems are frequently used in high performance applications such as enterprise servers and the like. Such systems characteristically experience periods of high activity, when all of the system's processors are operating at or near their theoretical potential, and periods of low activity, when the cumulative processing power greatly exceeds the demand. General purpose microprocessors, especially in high performance systems, are expensive to operate in part because of the large amount of electric current (i.e., power) they draw. As processors have increased in performance capability and complexity, the transistor count in these processors has increased accordingly while the minimum dimension of each transistor has decreased. A larger number of smaller transistors generally results in increased power consumption current due to sub-micron effects that are familiar to those in the field of semiconductor physics.

Recently, the amount of power consumed by server devices has become of paramount significance as large clusters of server devices are connected together in a single room. If the power consumption of the server devices is not controlled, the amount of energy consumed and the corresponding amount of heat dissipated in such rooms may negatively impact the performance or even functionality of a server or group of servers in addition to driving up the overall cost of operation. Accordingly, it would be highly desirable to implement a system and method in which the energy consumed by a multiprocessor system is reduced or minimized by selectively powering off processors during periods of reduced activity and enabling these processors during peak loading periods

SUMMARY OF THE INVENTION

The problems identified above are in large part addressed by a system and method for selectively activating and deactivating processors in a multi-processor system environment in response to variations in the demand for CPU processing power presented to the system. During periods of reduced processing activity, the system may select one or more its processors for deactivation. If the processing activity subsequently increases, the number of processors may be increased to insure that a minimum specified performance or response requirement is achieved. The system may include or employ various hardware facilities and/or software modules to monitor the system's workload, typically measured in terms of the demand for CPU cycles. The system may include a policy manager that receives workload information from the workload module and determines the required number of processors based on one or more predetermined performance criterion. In addition, the system may include a resource pool module that determines which processors are to be activated and deactivated in response to changes in the required number of processors as determined by the policy manager. The resource pool module may be further responsible for preparing a selected processor for deactivation by migrating any processes or thread running on the selected processor to other processor(s) in the pool of available processors and by flushing the contents of the selected processor's cache memory. The system may further include a CPU power control module that is configured to transition a processor selected for deactivation from a full power state to a low-power state.

BRIEF DESCRIPTION OF THE DRAWINGS

Other objects and advantages of the invention will become apparent upon reading the following detailed description and upon reference to the accompanying drawings in which.

Figure 1:
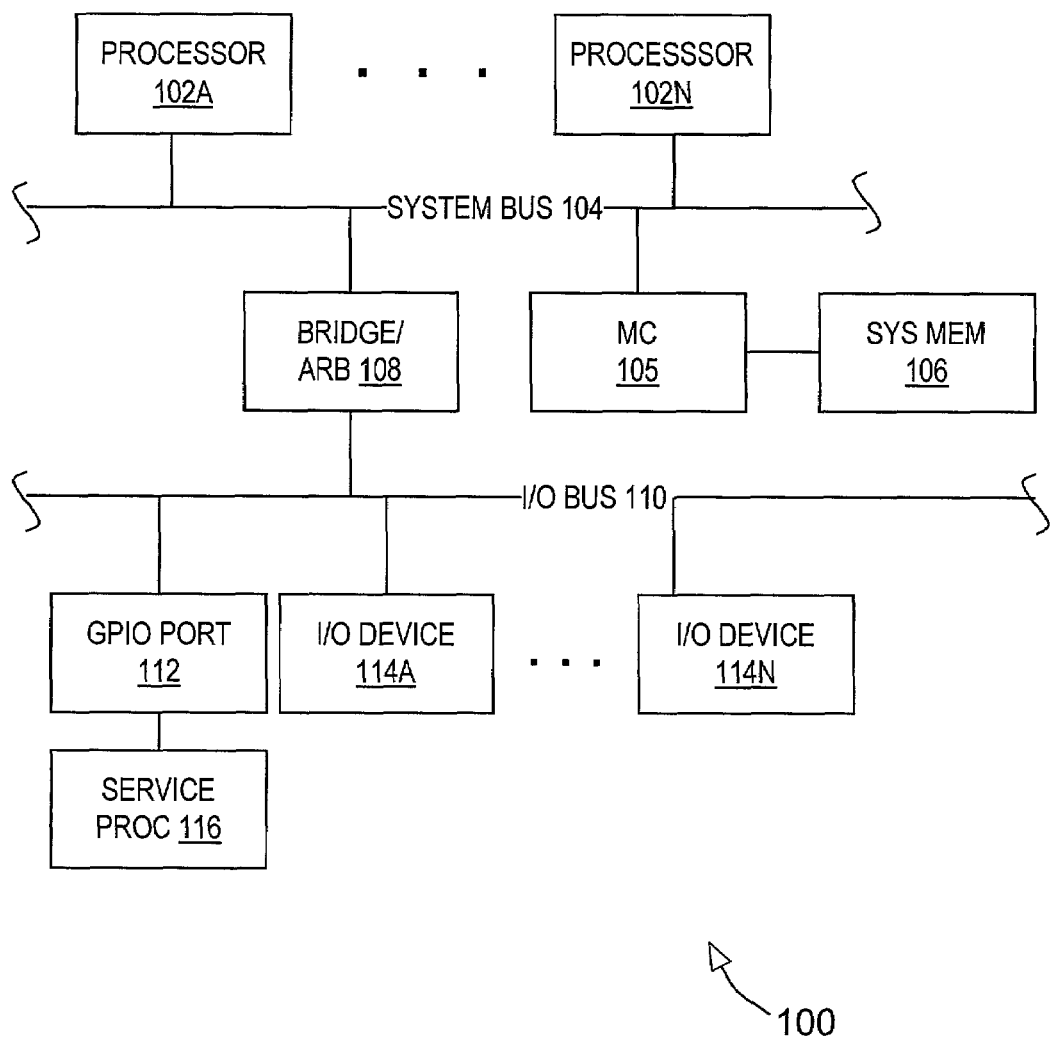
FIG. 1 is a block diagram of selected elements of a data processing system suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to FIG. 1, a block diagram of selected features of a multiprocessor data processing system 100 suitable for implementing the present invention is depicted. In the depicted embodiment, system 100 includes a set of two or more main processors 102A through 102N (generically or collectively referred to as processor(s) 102) that are connected to a system bus 104. A common system memory 106 is accessible to each processor 102 through an intervening memory controller 105 via system bus 104. Because each processor 102 has substantially equal access to system memory 106 such that the memory access time is substantially independent of the processor, the depicted embodiment of system 100 is an example of an SMP system.

In system 100, a bus bridge 108 provides an interface between system bus 104 and an I/O bus 110 to which one or more peripheral devices 114A through 114N (generically or collectively referred to as peripheral device(s) 114) are connected. Bus bridge 108 and memory controller 105 may be implemented with a chip set specifically designed for use with processors 102 and system bus 104. Peripheral devices 114 may include devices such as a graphics adapter, high-speed network adapter, hard-disk controller, and the like. I/O bus 110 is typically compliant with one of several industry standard I/O bus specifications including, as an example, the Peripheral Components Interface (PCI) bus as specified in *PCI Local Bus Specification Rev* 2.2 by the PCI Special Interest Group (www.pcisig.com). System 100 may include a service processor 116 connected to a GPIO port 112. Service processor 116 may be used to provide support for low-level system functions such as power monitoring, cooling fan control, hardware error logging, and so forth.

Figure 2:
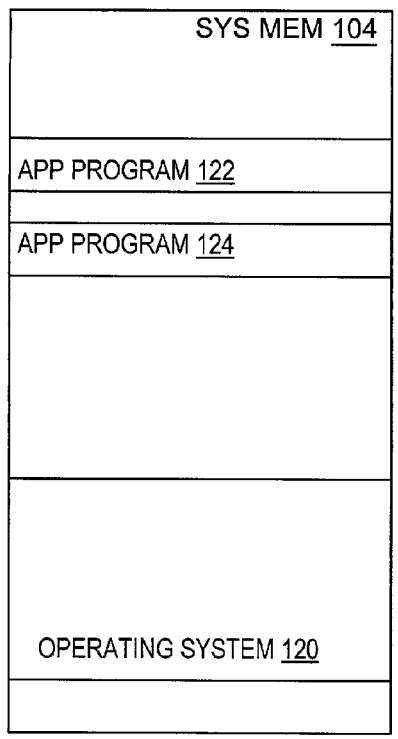
FIG. 2 is a conceptualized representation of the software of the data processing system of FIG. 1.
Figure 3:
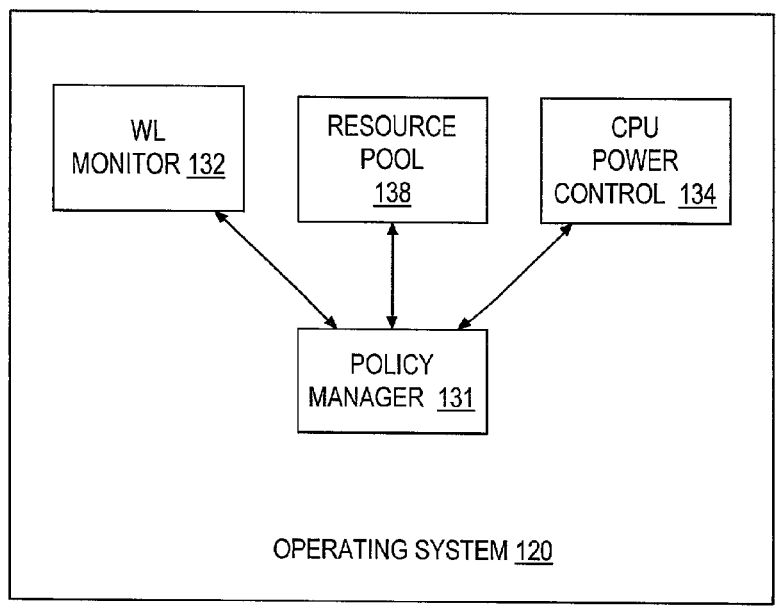
FIG. 3 is a conceptualized illustration of selected components of an operating system according to one embodiment of the present invention.

Portions of the present invention may be implemented as a set of computer executable instructions (software) stored on a computer readable medium such as system memory 106, a cache memory (not depicted) of a processor 102, or a floppy diskette, hard disk, CD ROM, DVD, magnetic tape, or other suitable storage element. Referring now to FIG. 2 and FIG. 3, conceptual illustrations of the software stored in system memory 106 for use in conjunction with the present invention are presented. In the illustrated embodiment, system memory 106 includes portions of an operating system 120. Operating system 120 typically comprises a multi-tasking operating system that supports multi-processor operation. Operating system 120 may incorporate portions of commercially distributed operating systems such as a Unix® family operating system like the AIX® operating system from IBM Corporation, a Linux® operating system, or a Windows® family operating system from Microsoft. Operating system 120 is responsible for enabling multiple application programs represented by application program 122 and 124 to execute simultaneously without corrupting each other's data.

To support multiprocessor operation, operating system 120 may include additional elements or software modules that facilitate monitoring and/or optimizing various system parameters. As an example, operating system 120 according to one embodiment of the invention may include a workload monitor module 132. As used in this disclosure, a system's workload refers to the demand for microprocessor cycles imposed on the system. This demand may originate from application programs running on the system or from external transaction requests received by the system via a network such as a local area network or the Internet. Workload module 132 is configured to monitor the current workload by determining or estimating the current demand for microprocessor cycles (also referred to as CPU cycles) required. Workload module 132 may utilize performance monitor hardware found in many commercially distributed general purpose microprocessors such as the PowerPC® family of processors from IBM Corporation and the Pentium® family of processors from Intel Corporation. In addition, workload module 132 may incorporate portions of performance monitoring software modules that are included in commercial operating systems. The Windows NT® operating system, for example, includes a task manager that displays the CPU utilization as a function of time.

The depicted embodiment of operating system 120 includes a policy manager module 131 that interacts with workload monitor module 132 and other modules to determine, based on the demand for CPU cycles, the minimum number of processors required to maintain a predetermined level of response performance. Policy manager 131 is configured to receive workload information from workload module 132. Policy manager 131 may incorporate some form of time averaging to prevent rapid oscillations in the number of processors required. Policy manager 131 may receive, for example, workload information periodically from workload module 132. The workload information typically includes, at a minimum, the workload module's determination of the number of CPU cycles currently required of the system. Policy manager 131 may average a series of workload data points over an extended period of time to reduce or smooth fluctuations in workload data. Based upon the workload information it receives, whether time averaged or otherwise, policy manager 131 may make a determination on the minimum number of processors required.

The determination of the number of processors required may vary according to the response performance required. Policy manager 131 may include a programmable setting that enables a user or system administrator to adjust the minimum response performance delivered by the system. If the minimum response performance is relaxed, policy manager 131 will generally execute with fewer processors. As an example, if workload module 132 determines that the demand for CPU cycles at the currently presented load with a response time of 2 ms is 750 megacycles/sec and each processor delivers 1 gigacycles/sec, policy manager 131 may determine that one processor is sufficient to meet the demand. However, if the response time criterion is reduced to 1 ms, policy manager 131 may then determine that 2 processors are required to meet the performance goal. Thus, generally speaking, the policy manager is configured to optimize (i.e., minimize) energy consumption in the processors by operating with the minimum number of processors sufficient to achieve a stated performance requirement.

Policy manager 131 may periodically determine the number of processors required as described above. This information may then be communicated to a resource pool module 138 and a CPU power control module 134. Resource pool module 138 is configured to work in conjunction with the multi-processor features of operating system 120 to increase and decrease the number of processors in response to the processor requirement information provided by policy manager 131. Resource pool module 138 may be further configured to facilitate the removal (or addition) of a processor from the operating system resource pool when policy manager 131 decreases (or increases) the number of required processors. In one embodiment, resource pool module 138 is configured to select a processor for deactivation in response to a decrease in the number of required processors by policy manager 131.

Resource pool module 138 may select the processor for deactivation in various methods. In one embodiment, resource pool module 138 selects the processor with the least pending activity for deactivation. In conventional SMP systems, processing activity is generally distributed approximately equally to each of the processors such that, at any given moment, each processor is handling about 1/Nth of the workload where N is the number of processors in the system. In one embodiment of data processing system 100 according to the present invention, however, the workload may be asymmetrically distributed to the processors in the system to facilitate the removal of processors from the available resource pool during periods of reduced demand.

Once a processor has been selected for deactivation, operating system 120, in conjunction with resource pool module 138, may initiate the deactivation process by migrating any processes running on the selected processor to another processor in the pool of available processors. Multiprocessor compatible operating systems typically include modules that enable the migration of processes among the various processors. In addition, the resource pool module 138 may be configured to ensure data coherency following the deactivation of a selected processor. Coherency may be maintained by flushing the cache memory of a processor selected for deactivation before deactivating the processor. Flushing the cache memory of a general purpose would typically include writing back any lines of the processor's cache that are both dirty and valid.

Once a processor selected for deactivation has been readied for deactivation through process migration and cache flushing as described above, policy manager 131 may then invoke a CPU power control module 134 to effect the electrical deactivation of a selected processor. General purpose microprocessors typically include power management facilities that enable the processor to operate in various power states. The various power states typically include a fully operational state, which requires the most power, a deep hibernation or sleep state that requires the least amount of power, and a standby state that requires an intermediate amount of power.

CPU power control module 134 is configured to power down one or more selected processors 102 in response to an appropriate request from policy manager 131. To maximize the power saving benefits of the invention, CPU power control module 134 may be configured to transition a selected processor into the deepest hibernation state (i.e., lower power state) that the processor supports.

Figure 4:
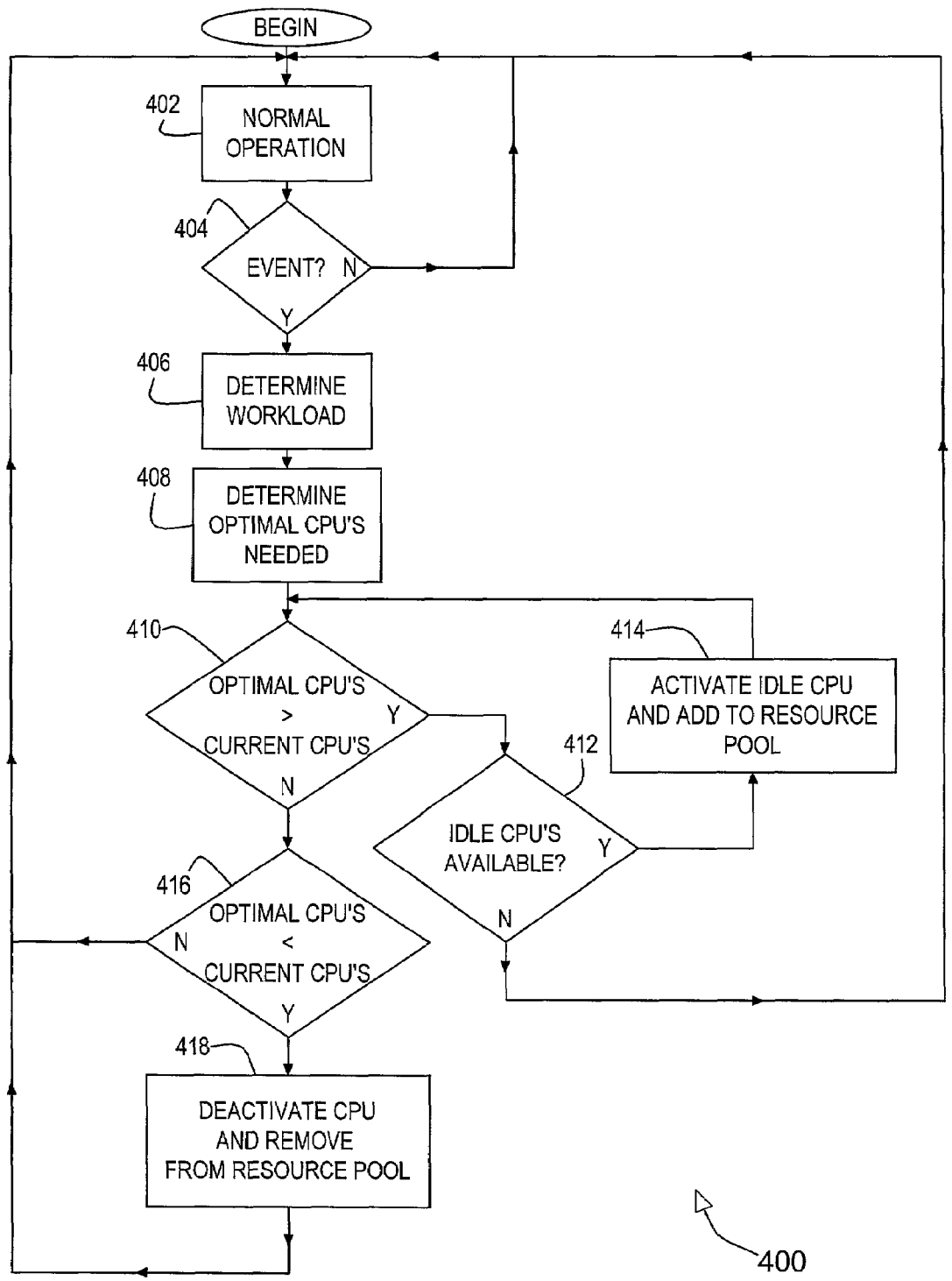
FIG. 4 is a flow diagram of a method of reducing power consumption in a data processing system.

Referring now to FIG. 4, a flow diagram of a method 400 of reducing power consumption in a multiprocessor system according to one embodiment of the invention is depicted. In the depicted embodiment, a multi-processor system is initially assumed to be in a normal operating mode (block 402). The normal operating mode typically represents a system state in which the operating system is fully loaded and functional and one or more application programs are executing. The system would typically remain in the normal operating mode until an event triggering a workload monitor check is detected (block 404). The workload monitor event may comprise the expiration of a predetermined time interval such that workload monitoring is initiated periodically at a predetermined frequency. In another embodiment, the workload monitoring may be triggered by an asynchronous event. The asynchronous event or events that trigger workload monitoring may comprise events tending to suggest that a change in workload is forthcoming. The initiation of a new process or the termination of an executing process, for example, might trigger workload monitoring. Similarly, workload monitoring may be triggered by the availability of transaction buffers on the system where a significant lack of buffers suggests that the workload is excessive and an overabundance of buffers suggests that the workload is low.

Responsive to the workload monitor triggering event, whether it be the lapse of time, the occurrence of a specified event, or a combination of the two, the system will initiate a determination (block 406) of its workload. The determination of the system workload in block 406 may include approximating the number of CPU cycles currently required to execute the processes that are active. Based upon the workload determination in block 406, the system will then determine the optimum number of CPU's required. The optimum number of processors is a function not only of the workload, but also of the performance requirements. If the performance requirements are relaxed, fewer CPU's are needed as a general rule. Based upon the current performance requirements, the system will determine (block 408) the optimum (i.e., fewest) number of CPU's required to meet those requirements. The system then determines (block 410) whether the optimum number of CPU's exceeds the number of currently activated CPU's. If additional CPU's are required to meet the minimum performance requirements, the system determines (block 412) whether additional CPU's are available. Typically, a processor will be considered available for activation if it is currently deactivated. If there is a deactivated processor that is available for activation, the system will select a processor to activate and activate (block 414) the processor and add it to the available resource pool of the operating system. Once an additional processor has been activated, the system may return to the normal operating state represented by block 402 where the process repeats. If the system determines in block 410 that the number of currently activated CPU's is sufficient to meet the current performance requirements, the system will further determine (block 416) if the optimum number of CPU's is less than the number of CPU's currently activated. Responsive to determining that the current workload could be handled by fewer processors than the number of currently activated processors, the system will select an active processor for deactivation, deactivate (block 418) the selected processor and remove the deactivated processor from the operating system's pool of available resources. The deactivation of a processor could include the preliminary steps of migrating processes that are executing on the processor to other active processors and flushing the contents of the processor's cache memory. If the system determines in block 416 that the optimum number of processors is not less than the number of active processors or if the system determines in block 412 that there are no active processors available, the system returns to the normal operation without altering the number of active processors. Following the deactivation of one or more processors in block 418, the system returns to the normal operation represented by block 402. In this manner, the method 400 forms a large loop within which the system operates as long as at least one processor in the system is functional and the described power management is enabled.

It will be apparent to those skilled in the art having the benefit of this disclosure that the present invention contemplates a system and method for minimizing power consumption in a multiprocessor system through selective activation and deactivation of processors in response to variations in workload. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of conserving power consumption in a multi-processor data processing system, comprising:
    accessing, via a bus, a memory of the data processing system by respective processors of the data processing system, wherein the accessing is a memory controller intervening between the processors and the memory, the memory controller providing each processor substantially equal access to the memory such that memory access time may be substantially independent of the respective processors, and wherein the data processing system includes an operating system;

providing, by a policy manager module of the operating system, a programmable setting enabling a user to specify, as a predetermined performance criterion, a minimum performance required to be delivered by the data processing system;

monitoring a workload of the system by a workload monitor module of the data processing system, wherein the monitoring of the workload of the data processing system includes:

triggering the workload monitoring responsive to an asynchronous event tending to indicate a change in workload, wherein the asynchronous event includes a change in availability of transaction buffers of the data processing system;

determining, by a policy manager module, a number of processors required to process the monitored workload at a predetermined performance criterion, wherein the determining of the number of processors by the policy manager module comprises:

receiving workload information from the workload module, including a series of workload data points indicating respectively current processor cycles corresponding to loads of the data processing system at respective times in the series;

averaging the series of workload data points to smooth fluctuations in the workload data points, wherein the determining of the number of processors is responsive to the averaged series of workload data points and the predetermined performance criterion; and selecting a processor for activation or deactivation by a resource pool module of the operating system responsive to an increase or decrease of processors indicated by the policy manager, the increase or decrease indication being responsive to the determining of the number of processors by the policy manager module, and wherein the selecting a processor for activation or deactivation includes selecting a particular processor based on the particular processor's workload;

activating or deactivating one or more processors to conform the number of active processors, in the data processing system to the determined number of processors, wherein the activating or deactivating is initiated by a power control module of the operating system responsive to the selecting by the resource pool module; and processing the workload with the active processors while maintaining the deactivated processors in a reduced power state.

2. The method of claim 1, wherein determining the number of processors required comprises determining the minimum number of processors required to achieve the performance criterion.

3. The method of claim 1, wherein deactivating a processor includes migrating processes running on a processor selected for deactivation to another processor.

4. The method of claim 3, wherein deactivating a processor further includes flushing the processor's cache memory before deactivating the processor.

5. The method of claim 1, wherein deactivating a processor comprises transitioning a processor to the lowest power state supported by the processor.

6. The method of claim 1, wherein monitoring the workload comprises determining the demand for CPU cycles.

7. The method of claim 6, wherein monitoring the workload includes determining instantaneous workload periodically.

8. A data processing system including an operating system, processor, memory, and I/O means, the system including a sequence of processor executable instructions for conserving power, the instructions being stored on a computer readable medium, comprising:

instructions of a policy manager module of the operating system for providing a programmable setting enabling a user to specify, as a predetermined performance criterion, a minimum performance required to be delivered by the data processing system, wherein in the data processing system a workload monitor monitors workload, wherein the monitoring of the workload of the data processing system includes triggering the workload monitoring responsive to an asynchronous event tending to indicate a change in workload, wherein the asynchronous event includes a change in availability of transaction buffers of the data processing system, and wherein a memory of the data processing system is accessed via a bus by respective processors of the data processing system, the accessing being through a memory controller intervening between the processors and the memory, wherein the memory controller provides each processor substantially equal access to the memory such that memory access time may be substantially independent of the respective processors;

instructions of the policy manager module for determining a number of processors required to process the monitored workload at a predetermined performance criterion, wherein the determining of the number of processors by the policy manager module comprises:

receiving workload information from the workload module, including a series of workload data points indicating respectively current processor cycles corresponding to loads of the data processing system at respective times in the series;

averaging the series of workload data points to smooth fluctuations in the workload data points, wherein the determining of the number of processors is responsive to the averaged series of workload data points and the predetermined performance criterion;

selecting a processor for activation or deactivation by a resource pool module of the operating system responsive to an increase or decrease of processors indicated by the policy manager, the increase or decrease indication being responsive to the determining of the number of processors by the policy manager module;

instructions of a resource pool module of the operating system for activating or deactivating one or more processors to conform the number of active processors in the data processing system to the determined number of processors, wherein the activating or deactivating is initiated by a power control module of the operating system responsive to the selecting by the resource pool module, and wherein the selecting a processor for activation or deactivation includes selecting a particular processor based on the particular processor's workload; and instructions for processing the workload with the active processors while maintaining the deactivated processors in a reduced power state.

9. The system of claim 8, wherein the instructions for determining the number of processors required comprises instructions for determining the minimum number of processors required to achieve the performance criterion.

10. The system of claim 8, wherein the instructions for deactivating a processor includes instructions for migrating processes running on a processor selected for deactivation to another processor.

11. The system of claim 10, wherein the instructions for deactivating a processor further includes instructions for flushing the processor's cache memory before deactivating the processor.

12. The system of claim 8, wherein the instructions for deactivating a processor comprises instructions for transitioning a processor to the lowest power state supported by the processor.

13. The system of claim 8, wherein the instructions for monitoring the workload comprises instructions for determining the demand for CPU cycles.

14. The system of claim 13, wherein the instructions for monitoring the workload includes instructions for determining instantaneous workload periodically.

15. A computer program product comprising a sequence of processor executable instructions for conserving power in a data processing system including an operating system, processor, memory, and I/O means, the instructions being stored on a computer readable medium, comprising:
  instructions of a policy manager module of the operating system for providing a programmable setting enabling a user to specify, as a predetermined performance criterion, a minimum performance required to be delivered by the data processing system, wherein in the data processing system a workload monitor monitors workload, wherein the monitoring of the workload of the data processing system includes triggering the workload monitoring responsive to an asynchronous event tending to indicate a change in workload, wherein the asynchronous event includes a change in availability of transaction buffers of the data processing system, and wherein a memory of the data processing system is accessed via a bus by respective processors of the data processing system, the accessing being through a memory controller intervening between the processors and the memory, wherein the memory controller provides each processor substantially equal access to the memory such that memory access time may be substantially independent of the respective processors;
  instructions of the policy manager module for determining a number of processors required to process the monitored workload at a predetermined performance criterion, wherein the determining of the number of processors by the policy manager module comprises:
    receiving workload information from the workload module, including a series of workload data points indicating respectively current processor cycles corresponding to loads of the data processing system at respective times in the series;
    averaging the series of workload data points to smooth fluctuations in the workload data points, wherein the determining of the number of processors is responsive to the averaged series of workload data points and the predetermined performance criterion;
    selecting a processor for activation or deactivation by a resource pool module of the operating system responsive to an increase or decrease of processors indicated by the policy manager, the increase or decrease indication being responsive to the determining of the number of processors by the policy manager module, and wherein the selecting a processor for activation or deactivation includes selecting a particular processor based on the particular processor's workload;
  instructions of a resource pool module of the operating system for activating or deactivating one or more processors to conform the number of active processors in the data processing system to the determined number of processors, wherein the activating or deactivating is initiated by a power control module of the operating system responsive to the selecting by the resource pool module; and
  instructions for processing the workload with the active processors while maintaining the deactivated processors in a reduced power state.

16. The computer program product of claim 15, wherein the instructions for determining the number of processors required comprises instructions for determining the minimum number of processors required to achieve the performance criterion.

17. The computer program product of claim 15, wherein the instructions for deactivating a processor includes instructions for migrating processes running on a processor selected for deactivation to another processor.

18. The computer program product of claim 17, wherein the instructions for deactivating a processor further includes instructions for flushing the processor's cache memory before deactivating the processor.

19. The computer program product of claim 15, wherein the instructions for deactivating a processor comprises instructions for transitioning a processor to the lowest power state supported by the processor.

20. The computer program product of claim 15, wherein the instructions for monitoring the workload comprises instructions for determining the demand for CPU cycles.

21. The computer program product of claim 20, wherein the instructions for monitoring the workload includes instructions for determining instantaneous workload periodically.

* * * * *